Figure 1:
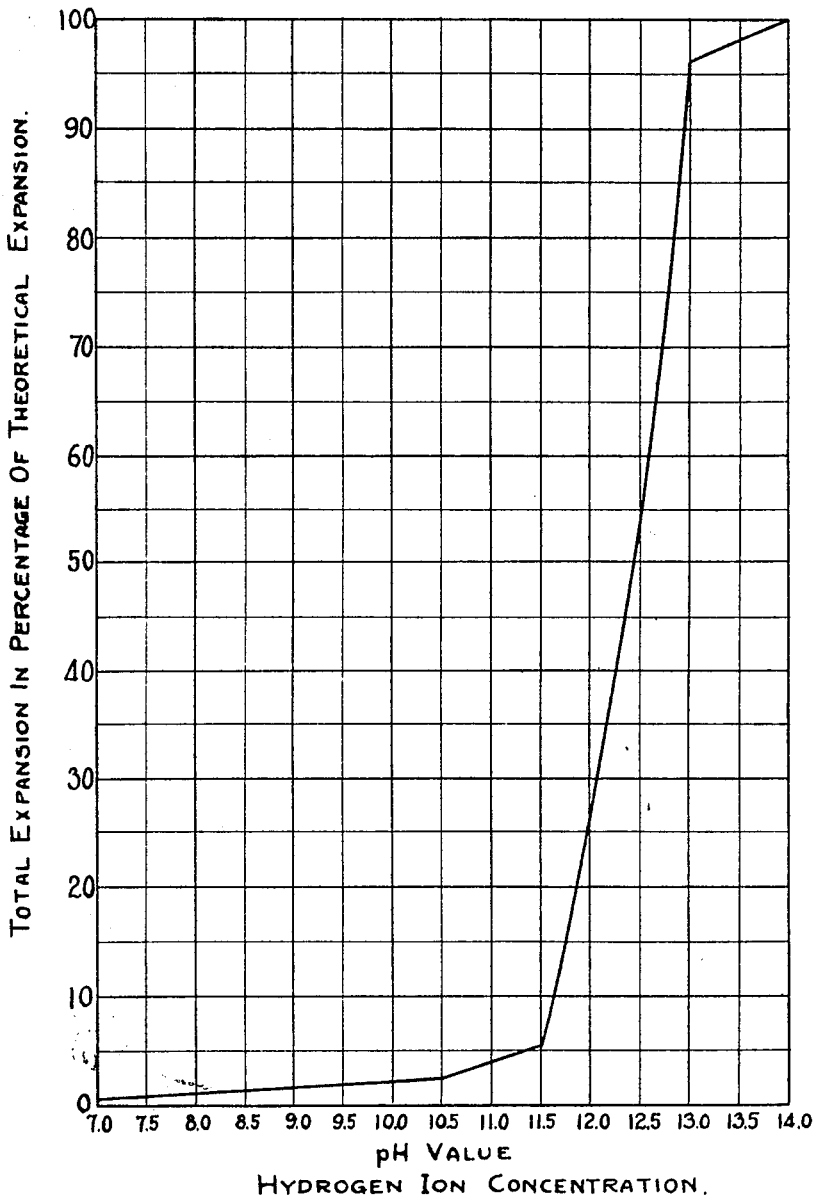

April 10, 1934.  W. L. CALDWELL  1,954,117

MANUFACTURE OF POROUS CONCRETE

Filed Sept. 14, 1931   2 Sheets-Sheet 2

Inventor:
Wallace L Caldwell.
By Frank L Belknap
Attorney

COATING OR PLASTIC.

Patented Apr. 10, 1934

1,954,117

UNITED STATES PATENT OFFICE 1,954,117

MANUFACTURE OF POROUS CONCRETE

Wallace L. Caldwell, Birmingham, Ala.

Application September 14, 1931, Serial No. 562,832

10 Claims. (Cl. 106—24)

This invention relates to improvements in process of making porous or cellular concrete and is particularly directed towards the adjustment of the character of the concrete mixture so as to give greater efficiency and more definite control of the reaction bringing about expansion.

Porous concrete is usually made according to the patent of Aylsworth and Dyer, No. 1,087,098, dated February 14, 1914. In actual practice, in addition to the mixture of cement and water specified in the above patent, aggregate of various kinds, such as sand, cinders, crushed slag, crushed stone, granulated slag, or burned clay are commonly used. Expansion is caused by the generation of a gas within the concrete mixture prior to setting. Various materials are mentioned in the patent as suitable for this reaction bringing about the evolution of a gas. Experience has proven powdered metallic aluminum to be a suitable material as an expanding agent. However, metallic calcium, zinc, magnesium, barium or lithium may be used in place of aluminum as may be certain alloys and amalgams of these metals. Carbides of calcium or barium may also be used as expanding agents.

It is only recently that substantial progress has been made in the commercial manufacture of porous concrete according to the Aylsworth and Dyer invention, apparently due to a lack of knowledge of the fundamental conditions needed for the control of the expansion. It was found that with some cements fairly good expansion took place, while with other cements, apparently of the same quality as far as usual tests were concerned, the reaction was so slow or so incomplete as to produce very little expansion. Furthermore, the percentage of expansion could not be controlled with a sufficient degree of accuracy for the practical requirements of building construction or of precast unit manufacture. It was also seen that in addition to the properties of the cement, the characteristics of the other ingredients of the mixture had a very definite and pronounced effect upon the speed and extent of the reaction governing the expansion.

In practice, conditions and materials were frequently encountered which made the efficient and economical production of porous concrete difficult, and in some cases, impossible. In the lack of any fundamental knowledge as to the optimum conditions essential to such production, resort was had to hit and miss methods of change of material and conditions of mixing until by chance, suitable materials and conditions were sometimes found.

By extended observation of practice and by laboratory research I have found that one of the important factors in understanding and controlling the reaction which produces evolution of gas and consequent expansion of the concrete resides in the hydrogen ion concentration or pH value of the aqueous suspension of the concrete mixture during the period from mixing to setting. I have further found that the hydrogen ion concentrations of such suspensions are not only important in themselves but must be considered in relation to the basic character of the cement, the acidic or basic character of the aggregate, the acidic or basic character of the mixing water, and the acidic or basic character of other admixtures added to the concrete.

In the drawings, Fig. 1 is a chart showing a curve plotted between hydrogen ion concentration, as abscissa, and total expansion in percentage of theoretical expansion as ordinates.

Figure 2:
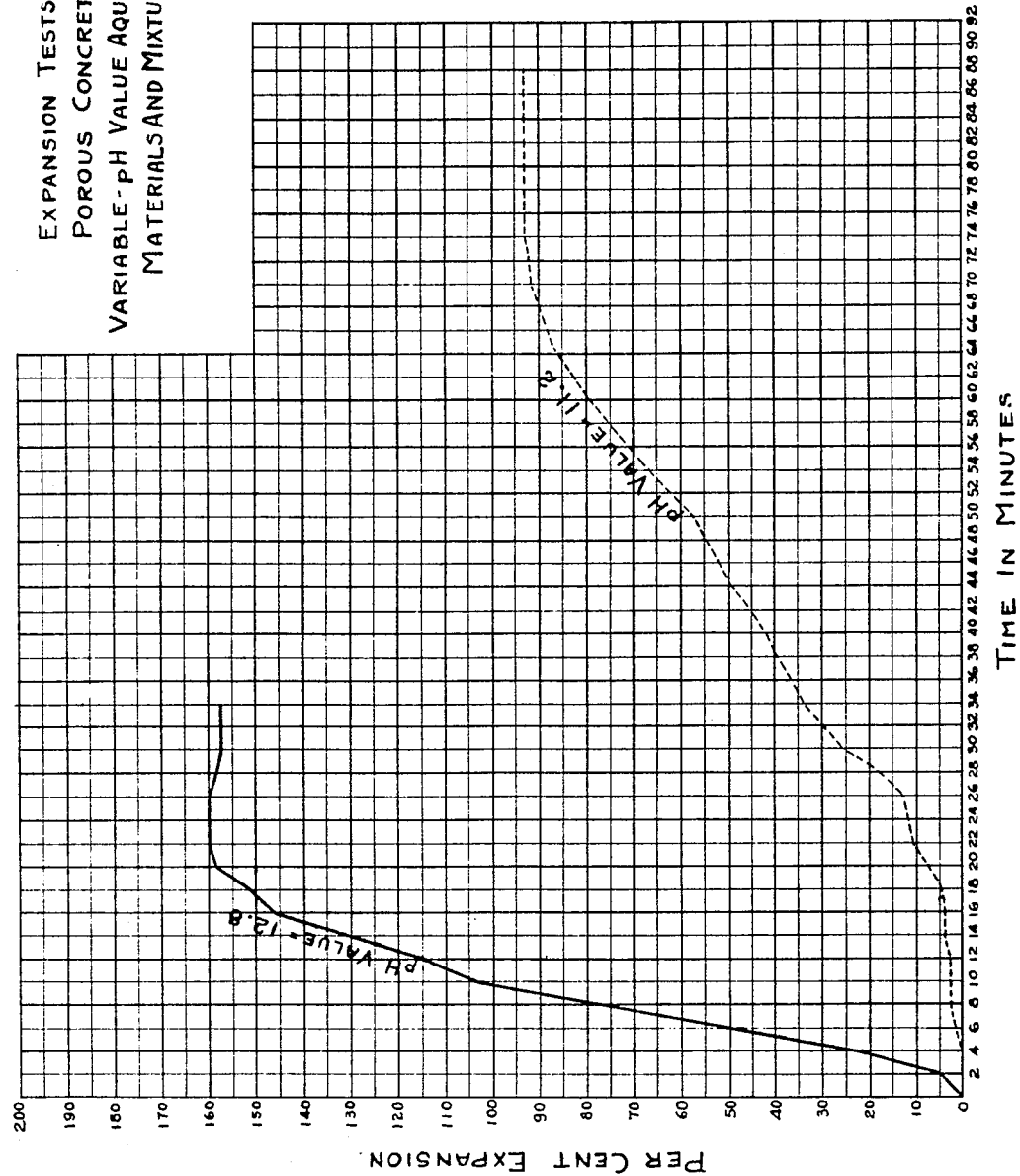

Fig. 2 is a chart showing curves representing different pH values plotted between time of expansion and minutes and percent expansion.

Various types of cement such as Portland cement, natural cement, slag cement, and Puzzolon cement are used in manufacture of porous concrete. All cements of above types are basic but there is a marked difference in the pH value of the aqueous suspension of different cements. There is a wide difference in the pH value of suspensions of different standard brands of Portland cement. The pH values of aqueous suspensions of Portland cements in wide use range from pH11.0 to pH12.0. This difference is largely due to percentage of alkali ($Na_2O$ and $K_2O$) in the cement. This figure ranges from .20% to 2.75%. These cements within the lower range of pH value are sometimes difficult to utilize in the manufacture of porous concrete made according to the specifications of the Aylsworth and Dyer patent.

Various types of aggregate can be, and in commercial production generally are used in the manufacture of porous concrete. Sands of varying mineralogical composition, frequently with material percentages of clay or loam, are used. Cinders from both anthracite and bituminous coal, basic slag, acid slag, crushed granite and crushed limestone are the aggregates encountered. The aqueous suspension of certain of these aggregates is basic while in the case of most cinders and loamy sands the reaction is acidic and the pH value of an aqueous suspension thereof lies well within the acid range.

There is a marked difference in the pH value of waters commonly used in mixing porous concrete. Some lie well within the acid range while others are decidedly basic.

Various materials are often admixed, in small proportions, with porous concrete mixtures for the purpose of producing greater plasticity of mix, for regulating setting time, and for other purposes. Among these materials are hydrated lime, pulverized slag, pulverized silica, clay, bentonite, diatomaceous earth, volcanic ash, calcium chloride, and sodium chloride. The pH values of the water suspensions or solutions of these materials vary over a wide range, some being acidic and others basic.

It will be understood that the mixing of the various materials, above described, in the varying proportions required for commercial production of the different classes of porous concrete will result in mixtures having a wide range of hydrogen ion concentration.

The expanding agent in most common commercial use is powdered metallic aluminum. The evolution of gas is due to the property which aluminum has of decomposing water with the formation of hydrogen gas. At temperatures of 30° C. or higher, aluminum will react directly with water according to the equation, $$2Al + 6H_2O = 2Al(OH)_3 + 3H_2$$

except at rather high temperatures this reaction proceeds slowly. At lower temperatures metallic aluminum decomposes water when in alkaline solution. In a solution of sodium hydroxide the reaction is as follows:

$$Al + NaOH + H_2O = NaAlO_2 + 3H.$$

From the above equation it may be determined that, upon complete reaction, 1.0 gram aluminum will cause the evolution of .11158 gram of hydrogen, which at standard conditions of 0° C. temperature and 760 mm. pressure will be equivalent to 1242.2 cubic centimeters of hydrogen gas.

It will be understood that the hydrogen gas evolved is in the form of molecular hydrogen and is totally distinct from and does not influence the hydrogen ion concentration of the aqueous suspension of the concrete mixture.

Both in practical manufacture of porous concrete and in the laboratory it has been found very difficult to approach theoretical efficiency in evolution of gas and consequent percentage of expansion. Furthermore, as has been indicated above, there have been frequent wide and apparently inexplicable variations in percentage of expansion. To permit of successful and economical manufacture it is imperative that the greatest possible percentage of theoretical expansion be attained because with low efficiency so high a percentage of expanding agent is required that cost becomes prohibitive. Further, it is essential that a uniform expansion be secured, which is capable of predetermination.

Research as to the causes of failure and eccentricity in expansion occurring in actual production of porous concrete developed the fact that the relative efficiency of the reaction and the uniformity of expansion essential for predetermination of results, depended largely upon the hydrogen ion concentration or pH value of the aqueous suspension of the porous concrete mixture.

Fig. 1 of the drawings show in graphic form the percentage of theoretical expansion developed by evolution of hydrogen from aqueous suspensions with a range of pH value from 7.0 to 14.0 which covers nearly the whole of the alkaline range. It will be noted that very little expansion is secured below a pH value of 12.0 and that relatively the greatest expansion is within the range pH 12.0 to pH 13.0. With pH values in excess of 13.5 the rate of expansion is too rapid to serve the ordinary commercial methods of manufacture of porous concrete.

The greater number of Portland cements produce an aqueous suspension with a pH value of from 11.2 to 11.6. Certain cements produce an aqueous suspension with a value of pH 11.2, while a very few have a value of pH 12.0. By examination of the drawings it will be seen that these aqueous suspensions of Portland cement lie below the minimum optimum pH value. The Aylsworth and Dyer patent suggested the admixture of hydrated lime and such an admixture has been frequently used. However, it has been found that the use of hydrated lime in permissible proportions does not greatly add to the pH value of aqueous suspension of resulting mixture. In some cases with Portland cements in the lower range of pH value at 11.2, the addition of hydrated lime may increase the pH value to 11.4.

I have found that, by careful control and suitable tests, it is possible to raise the pH value of the porous concrete mixture to within the optimum range by adding suitable amounts of electrolytes capable of raising the hydrogen ion concentration. Hydroxides and carbonates of the alkali metals and the alkaline earth metals have been used for this purpose. They may be added to the mixture in solution form or under certain conditions in powdered or crystalline forms which will go into solution during the process of mixing. A knowledge of the properties, as regards pH value, of the constituents of any porous concrete mixture, will permit the adjustment of the pH value of the mixture to any predetermined figure and thereby make it possible to secure any desired expansion and to produce whatever degree of completeness of reaction of expanding agent may be desired.

Aylsworth and Dyer and other subsequent workers in this field found that aluminum powder must be added to the porous concrete mixture in the proportions of from one-quarter to one-half of one percent by weight. I have found that by proper control of the hydrogen ion concentration of the aqueous suspension of the mixture it is possible to reduce the percentage of aluminum powder to approximately one-tenth of one percent by weight. The commercial importance of this invention will be clearly seen by considering an actual application. Sixty pounds per cubic foot porous concrete has a weight of 1620 pounds per cubic yard (the usual commercial unit). At one-half of one percent the aluminum requirement would be 8.1 pounds per cubic yard. With proper control of pH value this same weight of porous concrete is being regularly produced with 1.2 pounds aluminum powder per cubic yard. At 60 cents per pound the cost of aluminum powder required for one cubic yard will, in the first instance, be $4.86 while if my invention be used the cost of aluminum powder per cubic yard may be reduced to approximately $.72.

The other important feature of this invention is the possibility of predetermining the percentage of expansion. This is of primary importance in actual construction since forms must be filled to a certain height with the wet mixture which then expands during a period of from thirty to sixty minutes. If the expansion is too great the excess concrete is wasted and must be removed, while if expansion is insufficient, the slabs or blocks of porous concrete must usually be destroyed and repoured, since pouring in layers is seldom, if ever, permissible.

The data given below, supplemented by Fig. 2 of the drawings gives the results of certain expansion tests with "Universal" cement, one of the most widely used cements on the market. These tests clearly indicate the effect of hydrogen ion concentration upon rate and percentage of expansion. This data is derived from actual experience in commercial field cast work and precast unit manufacture.

As an example of the use of this invention, it has been found that one of the most prominent Portland cements on the market is low in alkali content and, therefore, the aqueous suspension of this cement, in the mixtures customarily used for manufacture of porous concrete, has a pH value of 11.2. This pH value is too low to permit of satisfactory development of the reaction with the aluminum powder which causes the expansion. When this cement is used without adjustment of the pH value, the expansion takes place very slowly, at the 20 minute period having reached an expansion of only from 5% to 10%, and reaches its maximum expansion only in from 75 to 90 minutes. Furthermore, due to incomplete reaction, the maximum expansion is so low, being less than 50% of theoretical expansion, that the product is entirely unsatisfactory and the cost high.

However, if the pH value is adjusted so as to bring the hydrogen ion concentration of the aqueous suspension of the porous concrete mixture to within the optimum range, it is possible to make use of the same cement, with entirely satisfactory results. For instance, by the addition of a solution of an hydroxide of an alkali metal, it is possible to increase the pH value to whatever point desired.

It has been found that by adding about 2 quarts of 10% solution of sodium hydroxide to the approximately 7 gallons of water per bag of cement, used in a porous concrete mixture, the pH value of the same cement can be increased to 12.8. This pH value of aqueous suspension causes the expanding reaction to proceed at a rate suitable for the conditions required in practical operations and furthermore the reaction is more nearly complete, permitting the production of a product with the required expansion. Also, since the percentage of aluminum needed to bring about a given percentage of expansion is less, the saving in cost is an important element in the adjustment of pH value.

An actual illustration of the comparative results of the two mixtures described above is given below:

*Mixture*

|  | pH value 11.2 | pH value 12.8 |
| --- | --- | --- |
| Universal cement | 94 lbs | 94 lbs. |
| Aluminum powder | 2½ oz | 2½ oz. |
| Water | 7 gals | 7 gals. |
| 10 percent sodium hydroxide solution |  | 2 qts. |
| Percent expansion at 10 minutes | 2.0% | 105%. |
| Percent expansion at 20 minutes | 7.0% | 158%. |
| Percent maximum expansion | 93.0% | 160%. |
| Time required maximum expansion | 74 minutes | 24 minutes. |

Fig. 2 of the drawings show the above graphically.

By the term "cement" as used herein, it is understood that I refer to all the various classes of hydraulic cements which are now, or which have been, in use in concrete or masonry construction; by the term "aggregates" I refer to the various classes of sand, cinders, slag, stone, or burned clay or shale aggregates used in concrete construction.

By the term "admixtures" as used herein it is understood that I refer to hydrated lime, pulverized silica of various types, pulverized slag, stone dust, diatomaceous earth, calcium chloride, sodium chloride, various products sold under trade names such as "Celite", "Colloy" and "Aquagel", or any other product used as a minor constituent of the concrete mixture.

By the term "expanding agent" as used herein is meant metallic aluminum, barium, calcium, zinc, magnesium, or lithium in powdered or other form; alloys of these metals in any desired combination or percentage when used either in powdered or other form; amalgams of these metals or their alloys, in powdered or other form; calcium carbide or barium carbide; or any other substance capable of evolving a gas when mixed in a concrete mixture.

The term "electrolyte" as used herein, is intended to include any acid or acidic salt or any base or basic salt employed thereas, or any similar substance capable of ionizing in solution to affect the hydrogen ion concentration thereof.

The term "hydrogen ion concentration" and "pH value" as used herein are synonymous.

The term "point of optimum expansion" as used herein is intended to cover that range of pH value wherein the actual expansion most closely approaches 100% of theoretical expansion.

The term "porous concrete" as used herein is intended to include any porous concrete mixtures composed of cement, and water, with an expanding agent, or of cement, aggregate, water, and an expanding agent, and either with or without admixtures. I do not desire to limit myself to a type of porous concrete produced by mixing only cement, water and an expanding agent. While a porous concrete can be made by mixing cement, water and an expanding agent, this is the type of porous concrete which is used for the very lightest weights of porous concrete which are primarily of an insulating value rather than of structural value. Therefore, I do not wish to be limited to such a type of concrete, but desire to include within the scope of this application porous concrete produced by mixing cement, water, aggregates and an expanding agent with or without admixtures. The greater portion of the bulk of most concrete mixtures consists of aggregates.

I claim as my invention:

1. A process of producing porous concrete which comprises forming a concrete mixture having a predetermined hydrogen ion concentration between 11.5 and 13.5 and incorporating with said concrete mixture an expanding agent capable of reacting with an alkali to evolve a gas.

2. A process of producing porous concrete which comprises forming a concrete mixture having a predetermined hydrogen ion concentration between 12 and 13 and incorporating with said concrete mixture an expanding agent capable of reacting with an alkali to evolve a gas.

3. A process of producing porous concrete which comprises forming a concrete mixture having a predetermined hydrogen ion concentration in excess of 11.5 and incorporating with said concrete mixture an expanding agent capable of reacting with an alkali to evolve a gas.

4. In the process of producing porous concrete, the steps which comprise incorporating with a concrete mixture an expanding agent capable of reacting with an alkali to evolve gas, and adding an electrolyte to bring the hydrogen ion concentration of the aqueous suspension of the mixture to a predetermined pH value between 12 and 13 in order to consistently produce substantially uniform porous concrete of the porosity desired.

5. In the process of producing porous concrete, the steps which comprise incorporating with a concrete mixture an expanding agent capable of reacting with an alkali to evolve gas, and adding an electrolyte to bring the hydrogen ion concentration of the aqueous suspension of the mixture to a predetermined pH value between 11.5 and 13.5 in order to consistently produce substantially uniform porous concrete of the porosity desired.

6. A process of producing porous concrete which comprises forming a concrete mixture having a predetermined hydrogen ion concentration between 11.5 and 13.5 and incorporating with said mixture a metallic powder capable of reacting with an alkali to evolve gas.

7. A process of producing porous concrete which comprises forming a concrete mixture having a predetermined hydrogen ion concentration between 12 and 13 and incorporating with said concrete mixture aluminum powder to react with the alkali present to evolve a gas.

8. In the process of producing porous concrete, the steps which comprise forming a concrete mixture, adding sodium hydroxide to the water used to form said mixture to raise the pH concentration of the mixture to a predetermined value between 12 and 13.5 and incorporating aluminum powder with the ingredients of said mixture to react with the alkali present to form a gas.

9. A process of producing porous concrete which comprises forming a concrete mixture having a predetermined pH concentration of the aqueous suspension of the mixture between 12 and 13 and including in said mixture an expanding agent capable of reacting with the alkali present to evolve a gas.

10. A process of producing porous concrete which comprises forming a concrete mixture having a predetermined pH concentration of the aqueous suspension of the mixture between 11.5 and 13.5 and including in said mixture an expanding agent capable of reacting with the alkali present to evolve a gas.

WALLACE L. CALDWELL.